B. RITTHAMER.
MEAT MOLD.
APPLICATION FILED JUNE 10, 1915.

1,182,040.

Patented May 9, 1916.

WITNESS
Frank H. Fowler

INVENTOR
Boleslon Ritthamer
BY Fred C. Goin
ATTORNEY

UNITED STATES PATENT OFFICE.

BOLESLAW RITTHAMER, OF SEATTLE, WASHINGTON.

MEAT-MOLD.

1,182,040.  Specification of Letters Patent.  Patented May 9, 1916.

Application filed June 10, 1915. Serial No. 33,356.

*To all whom it may concern:*

Be it known that I, BOLESLAW RITTHAMER, a citizen of the United States, and a resident of Seattle, in the county of King and State of Washington, have invented certain new and useful Improvements in Meat-Molds, of which the following is a full, true, and exact specification.

My invention relates to meat molds and more particularly to molds for forming and compressing boneless hams, and has for its principal object to provide a mold which will form the ham into a cylinder with square ends.

An additional object is to provide a mold which will tend to wrap and hold the skin of the ham around the outside of the meat, thereby doing away with the necessity of sewing the ham as is usual in the art.

A further object is to provide slots or perforations in the mold through which the gases and liquids of the ham may escape while boiling and may again return to the ham while cooling and thus prevent loss of weight in the ham during the cooking process.

Other objects will appear as my invention is more fully explained in the following specification, illustrated in the accompanying drawings and pointed out in the appended claim.

Figure 1:
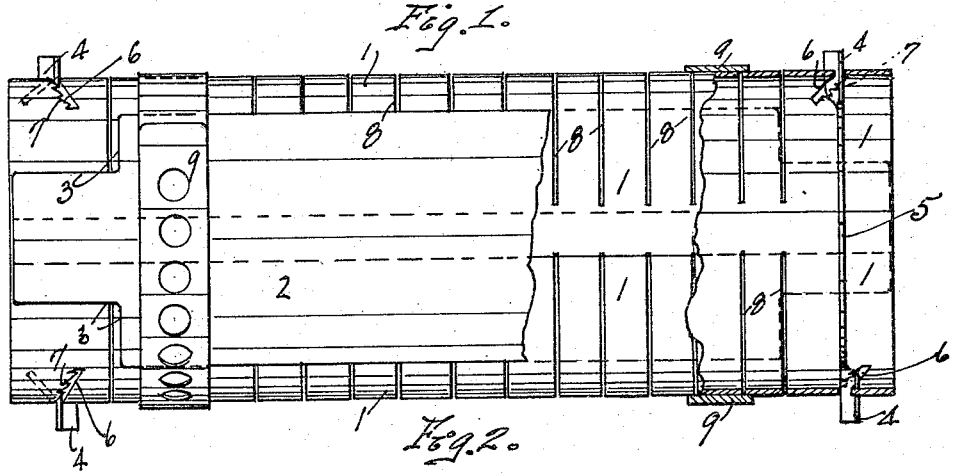
Figure 2:
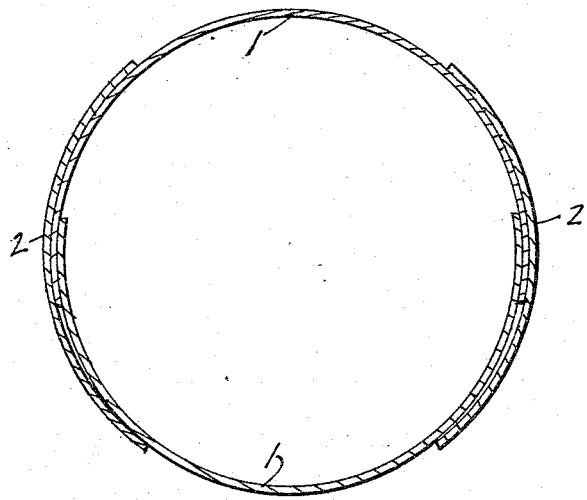
Figure 3:
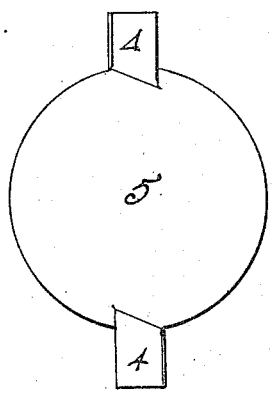

In the drawings, Figure 1 is an elevation of my mold with parts broken away. Fig. 2 is an enlarged cross sectional view. Fig. 3 is an elevation of an end plate.

Referring more particularly to the drawings, numeral 1 indicates similar top and bottom semi-cylindrical shells, preferably of a thin spring material. A segmental pair of outer lap plates fit over the lap of shells 1. The ends of plates 2 are cut away as at 3 to allow working space for lugs 4 from circular ends 5. The lugs 4 are diametrically opposite and have their planes bent at opposite angles to the plane of the end 5. Shells 1 are provided with spiral slots 6, one in either end. The outer edges of the slots 6 are provided with teeth 7 which engage the lugs 4 when extended through the slots 6. The spiral shape of the slots allows the ends 5 to move centrally along the mold as the said ends are partially rotated. Shells 1 are slotted as at 8 to allow more deformation in the mold and to allow the juices of the meat to escape during cooking and to return during cooling.

The process of molding a ham is as follows: The ham is rolled up with the skin outward and is placed in one of the shells 1, the ends are then placed and the other shell placed over the ham and lapping the first shell as shown in Figs. 1 and 2. The lap plates 2 are then placed on either side of the shells and covering the joints and the clamp straps 9 are placed around the mold. The ends 5 are now rotated tight up against the ham and locked in place against the notches 7. The entire mold is next placed in a cylindrical press and the mold brought together until the shells close down against the ends after which the straps 9 may be tightened and the press released. The ham is now ready for cooking after which process the ham is allowed to cool in the mold. When cold, the mold is opened and the ham removed. Various sizes of end plates may be used for various sizes of hams as the end plates determine the diameter of the pressed ham.

Hams pressed in my improved mold have square ends, are of uniform diameter, are almost entirely covered on the outside by skin or rind which forms a sanitary covering for the ham and holds it in place without sewing, all of which is in marked contrast to the present pressed hams as they are sewed, have loose skin due to injury in pressing, have rough and bulging ends and are not of uniform shape.

While I have shown a particular form of embodiment of my invention, I am aware that many minor changes therein will readily suggest themselves to others skilled in the art without departing from the spirit and scope of the invention, and I therefore, desire to avoid being limited to the exact form shown and described except as pointed out in the appended claim.

Having described my invention, what I claim as new and desire to protect by Letters Patent, is—

In a meat mold, the combination of a pair of perforated overlapping semi-cylindrical shells, circular end plates within a cylinder formed by the shells, means for adjusting the said ends longitudinally within the said cylinder, a pair of lap plates for lapping the longitudinal joints in the cylinder, and means for clamping the shells circumferentially against the said end plates, whereby a cylindrical mold closed at both ends is formed in which meat or the like may be molded into a uniformly cylindrical shape with square ends.

BOLESLAW RITTHAMER.

Copies of this patent may be obtained for five cents each, by addressing the "Commissioner of Patents, Washington, D. C."